June 28, 1955

A. S. NORCROSS 2,711,750

APPARATUS FOR CONTROLLING THE VISCOSITY
OF A PROCESSING LIQUID

Filed Sept. 15, 1950

Inventor
Austin S. Norcross
by Robt Cushman & Grover
Att'ys.

Inventor
Austin S. Norcross
by Robt Cushman & Grover
Att'ys.

June 28, 1955

A. S. NORCROSS 2,711,750

APPARATUS FOR CONTROLLING THE VISCOSITY
OF A PROCESSING LIQUID

Filed Sept. 15, 1950

Inventor
Austin S. Norcross
by Robert Cushman & Grover
Att'ys.

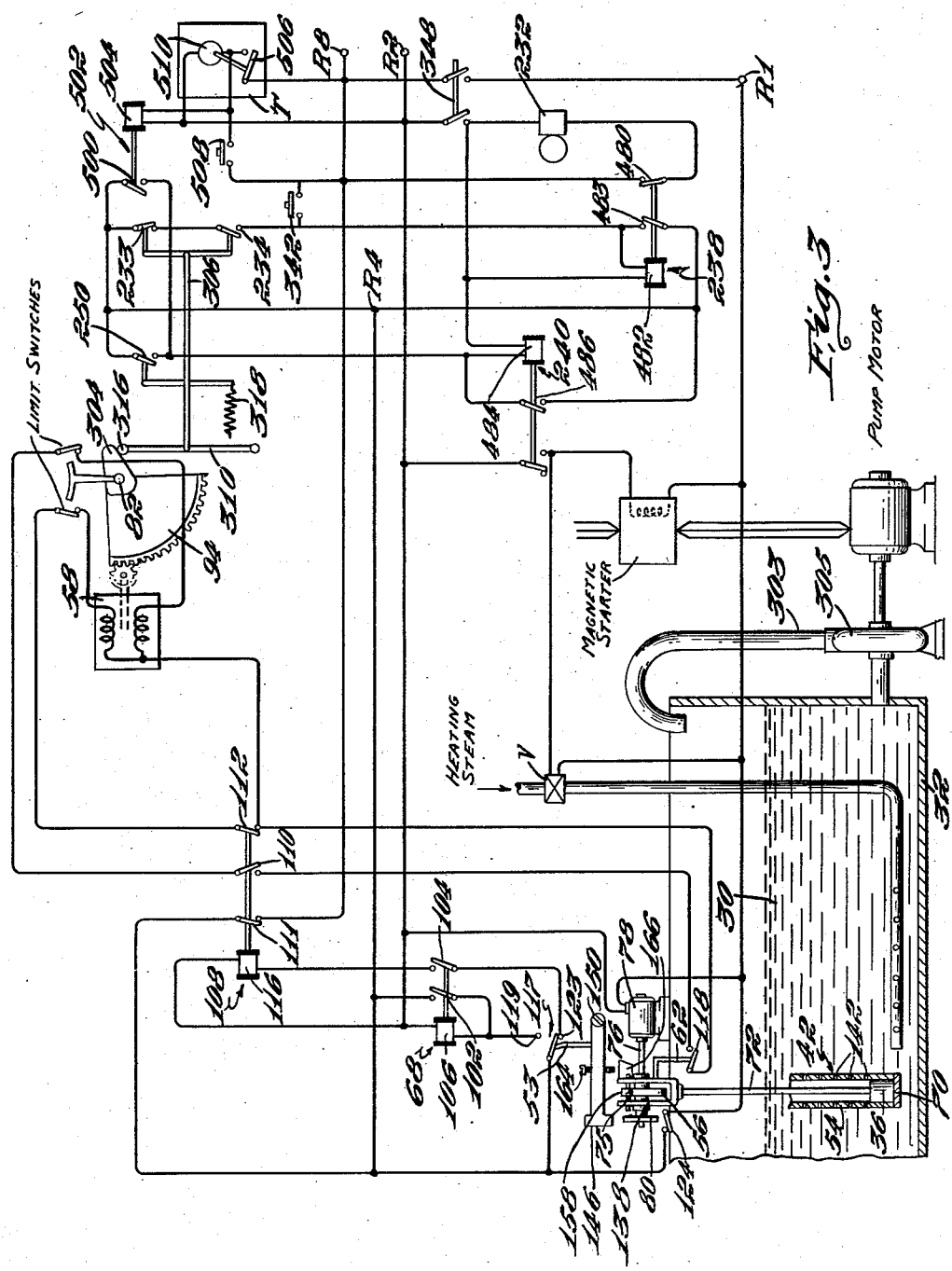

United States Patent Office 2,711,750
Patented June 28, 1955

2,711,750

APPARATUS FOR CONTROLLING THE VISCOSITY OF A PROCESSING LIQUID

Austin S. Norcross, Newton, Mass.

Application September 15, 1950, Serial No. 184,933

12 Claims. (Cl. 137—92)

This invention relates to apparatus for varying and controlling the viscosity of a liquid.

In my United States Letters Patent 2,630,819 which issued March 10, 1953 and of which the present copending application is a continuation in part, it was disclosed that the viscosity of a liquid can be varied by recirculating the liquid for example by means of a pump, and that by controlling the operation of the pump by means of a suitable control apparatus in response to the determinations of a viscometer such method and apparatus are particularly adapted to maintain the viscosity of the size in the size box of a textile slasher. While this apparatus operates in a satisfactory manner to produce starch mixtures having particles of uniform dimension and compensates for dilution resulting from the condensate from steam used to maintain the correct temperature and viscosity changes due to mechanical agitation, it necessitates the installation of a separate viscometer and associated control equipment upon each slasher which in a large mill involves a considerable expenditure.

It is accordingly the principal objects of this invention to provide apparatus for maintaining the viscosity of a body of liquid within predetermined limits which is automatic in operation, which maintain the viscosity within close limits, which keeps a running record of the viscosity, which sounds an alarm when the viscosity is not within the predetermined limits, which is particularly adapted to be used to bring the particles of textile sizing to substantially uniform dimension, which can be adapted to be used with existing slashing equipment, which can be used to control the temperature and mechanical agitator associated with the cooking kettle, and which advances the art generally.

In a broad aspect the invention contemplates apparatus for controlling viscosity comprising means for measuring the viscosity of a liquid and means such as a pump for recirculating the liquid thereby to change its viscosity, the recirculating means having control means associated therewith which is responsive to the measuring means to maintain the viscosity within preset limits.

In a more specific aspect the viscosity measuring means comprises a tubular member suspended with its lower apertured end in the liquid so that the liquid can flow therein. Means are provided for periodically raising and lowering a droppable body disposed within the tubular member whereby the period of time required for the body to traverse the fluid entrapped within the member is a function of the viscosity of the fluid. The duration of the body in traversing a predetermined portion is measured by timing means to which control means respond to control the pump or other recirculating means to maintain the viscosity of the liquid within preselected limits.

In a more specific aspect the control means includes switching means and relay means to control the pump, the switching means being operable at the beginning and end of the timing period of the droppable body to control a constant speed motor for moving a member a distance which is a function of the time period. The movable member operates further switching means which in turn energize the relay means associated with the pump.

In another board aspect the invention contemplates apparatus for controlling the heating means and homogenizing means such as a pump, homogenizer or other mechanical agitator for preparing an aqueous size which apparatus comprises measuring means for determining the size viscosity and control means for controlling the operation of either or both the heating and homogenizing means which measuring and control means are preferably although not necessarily similar to those described above.

In a still further aspect the control means renders the heating and homogenizing means inoperative after the viscosity of the size has reached a preselected limit. This control means includes a timer which prevents operation of the control means until after the elapse of a sufficient time period for the viscosity of the size to be initially raised above the preselected limit so that the low viscosity at the beginning of the heating cycle does not cause the control means to shut down the heating and homogenizing means.

These and other objects and aspects will be apparent from the following description of several illustrative specific embodiments referring to drawings wherein Fig. 1 is a schematic diagram of one embodiment of the invention wherein the viscosity measuring means is located in the mixing tank;

Fig. 3 is the wiring diagram for a second embodiment of the invention wherein the viscosity measuring means is positioned in the cooking tank;

Figure 1:
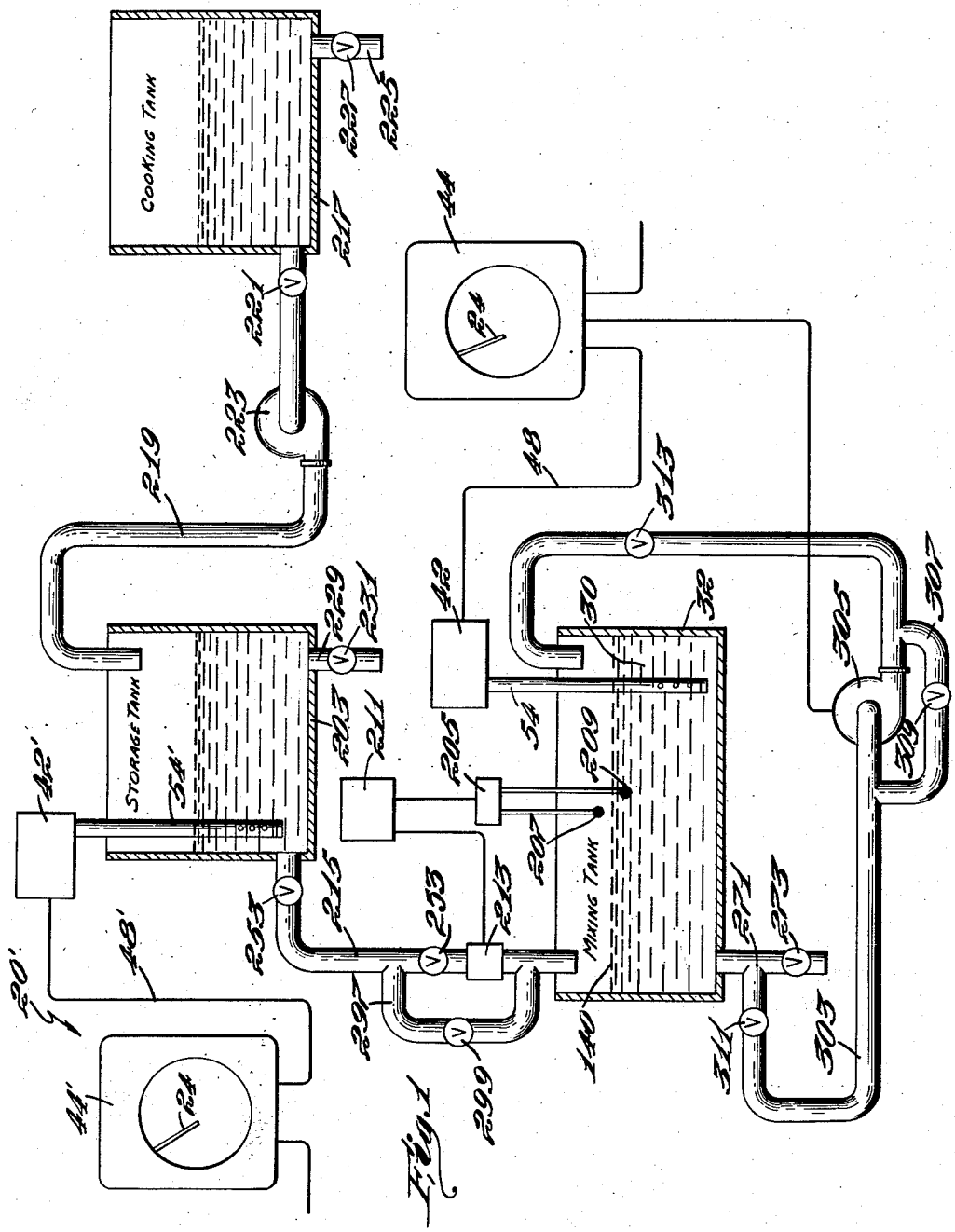

As is shown in Fig. 1 and was described in detail in my abovesaid patent, a liquid such as an aqueous size is heated in a kettle such as the cooking tank 217 which is provided with a discharge pipe 225 wherein is located a shut off valve 227. The heated size is drawn from the tank 217 through a valve 221 by means of a pump 223 whose discharge pipe 219 dumps the size into a storage tank 203. The viscosity of the liquid in the tank 203 is checked by means of a recording viscometer 20' consisting of a cylinder 54' suspended in the liquid in the tank from a control portion 42' which connects by a circuit 48' with a recorder portion 44', the portions being similar to corresponding elements of the viscometer shown in my United States Patent No. 2,491,389 which issued December 13, 1949.

The storage tank 203 can be drained by means of a discharge pipe 229 and a valve 231, but is normally drawn off by gravity through a supply line 215 which discharges into the mixing tank or size box 32. Flow through the line 215 is controlled by a solenoid operated valve 213 which is electrically connected with a control box 211 of a liquid level control 205 having two electrodes 207 and 209 extending down into the tank 32 which function to open the valve 213 whenever the liquid 30 in the tank falls below a preselected level. The line 215 is also provided with a shut off valve 253 and a bypass line 297 around the control valve 213 which bypass line is provided with a shut off valve 299.

A recirculating line 303, having a pump 305 therein, branches from the discharge line 271 in the bottom of the tank 32 above the shut off valve 273. The line 303 continues beyond the pump 305 until it discharges into the upper portion of the tank 32. The pump 305 is bypassed by the line 307 which is provided with a shut off valve 309. Two additional shut off valves 311 and 313 are inserted in the line 303 on either side of the pump 305 which when closed trap a fixed amount of liquid so that it is recirculated through the bypass line 307 by the pump thereby to provide a greater amount of agitation and homogenization for a small amount of liquid. The operation of the pump 305 is controlled by means of switching and relay means associated with a recorder device 44 and associated sampling device 42 which is suspended vertically so that the tubular member 54 is projected beneath the level 140 of the size 30 in the mixing tank 32. Electrical connections between the devices 42 and 44 are made by a circuit 48.

Figure 3A:
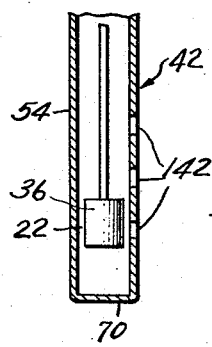
Fig. 3a is an enlarged fragmentary sectional view showing the details of construction of the sampling device.

As is best shown in Fig. 3, the device 42 comprises a motor 78 which is detachably mounted upon the top of the tank 32. The motor shaft 76 carries a cam 56 which contacts a roll 158 which is journaled upon a shaft 75 extending between the tines of the bifurcated upper end 138 of a piston rod 72.

The rod 72 extends downwardly into the tubular member 54 so that a piston 36 carried upon the opposite end of the rod is cyclically lifted by the rotation of the cam 56. The lower end of the member 54 is provided with a plurality of axially spaced perforations such as the apertures 142 so that the piston 36 is in a bath of liquid 30 drawn from the tank 32. The cam 56 has a profile formed so that after being raised to the top of the stroke the piston 36 and rod 72 are released to fall freely under the influence of gravity on the downward stroke. The lower end of the tubular member 54 is closed by an end piece such as the head 70 and the lowermost apertures 142 are spaced far enough from the closed end so that the descending of the piston 36 entraps liquid in the bottom of the tube which flows through the annular aperture or orifice 22 (Fig. 3a) formed by clearance between the piston 36 and the cylinder formed by the inner wall of the tubular member 54.

As is described in detail in my United States Patent No. 2,491,389 wherein a similar sampling device is shown, with an orifice 22 of constant area, the duration of the time period required for the piston 36 to traverse a preselected distance is a measure of the viscosity of the liquid 30 being sampled. The effective measuring distance traveled is determined by operation of switches 117 and 118 near the top and bottom respectively of stroke of the piston 36 as described in detail below. The double throw contacts of the starting switch 117 are transferred by means of a cross-shaped actuator 146 one end of which is pivotally secured by means of a pin 150. An adjusting screw 164 is threaded through the actuator so that the end thereof comes in contact with an arm 166 fastened to the bifurcated portion 138 of the rod 72 when the piston 36 is near the top of its stroke whereby the upward movement of the rod 72 moves the actuator so that an extension having a lip 53 transfers the contacts of the switch 117 from the position illustrated.

The contacts of the stop switch 118 are opened near the bottom of travel of the piston 36 by means of actuator 62 carried by the bifurcated end portion 138 of the rod 72. The normally closed contacts of a reset switch 124 are opened momentarily after the opening of the stop switch 118 by means of an auxiliary cam 80 carried on the end of the shaft 76 of the motor 78.

Figure 2:
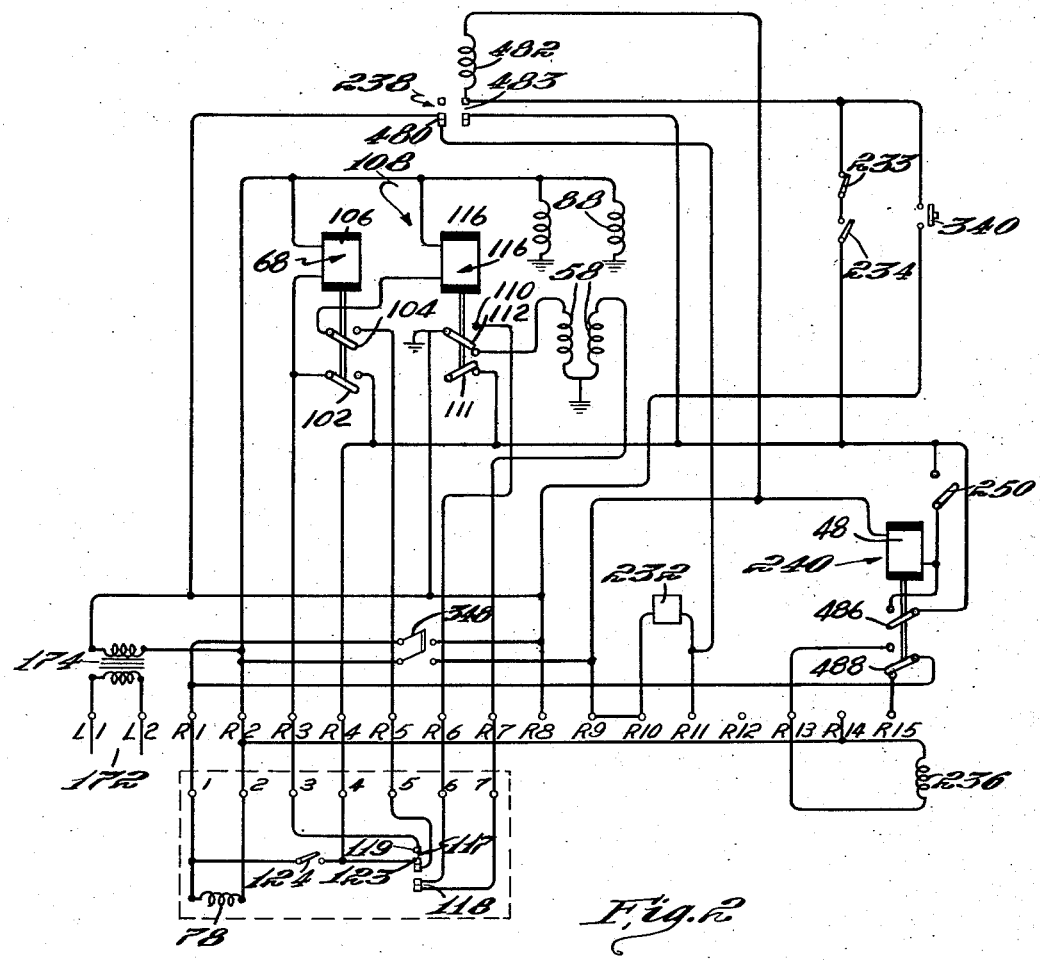
Fig. 2 is a wiring diagram of the embodiment shown in Fig. 1.

Operation of the system can best be understood with reference to the wiring diagram in Fig. 2 wherein the manual closing of a double pole main switch 348 applies power to terminals R1 and R9 to start the motor 78 thus starting the cyclic operation of the piston 36 as described above. Shortly before the piston 36 reaches its uppermost position the contacts 119 of the starting switch 117 are closed by the actuator 146 to complete a circuit energizing the solenoid 106 of the cocking relay 68 which circuit includes the terminal R1, the normally closed contacts of the switch 124, the contacts 119, the terminal R3, the solenoid 106 and the terminal R2.

The energization of the solenoid 106 transfers the normally open contacts 102 and 104, the contacts 102 completing a holding circuit through the terminal R4 to the common junction of the switches 124 and 117 which parallels the contacts of the starting switch 117 so that the solenoid 106 is not deenergized by the subsequent opening of the switch contacts 119 of the switch 117 as the piston 36 descends.

The contacts 123 of the starting switch 117 are closed simultaneously with the opening of the contacts 119 to energize the solenoid 116 of the firing relay 108 by means of a circuit including the terminal R1, the switch 124, the contacts 123 of the starting switch 117, the terminal R5, the relay contacts 104, the solenoid 116 and the terminal R2. The energization of the solenoid 116 transfers the connections to contacts 110, 111 and 112. The contacts 111 when closed complete a circuit between the terminals R4 and R8 which shunts the main switch 348 so that if the switch is opened at an intermediate point in the piston cycle, the lift motor will continue to operate until the switch 124 opens at the bottom of a stroke by energy supplied through a circuit including the terminal R8 (which is energized at all times from the transformer 174), the contacts 111, the terminal R4, the switch 124, the terminal R1, the motor 78 and the terminal R2.

When the solenoid 116 is not energized the normally closed contacts 112 shunt one of the shaded-pole windings of a motor 58 for operating the recording pen arm 24 (Fig. 1) by means of the geared quadrant 94 (Fig. 3) or the equivalent lever arrangement shown in my above mentioned copending application so as to move the arm towards the zero position of the recorder. When the solenoid 116 is energized by the operation of switch 117 at the start of the timing period as described above the contacts 112 open to remove the shunt from the winding. The contacts 110 simultaneously close to shunt the other shaded pole winding by means of a circuit including the terminal R6, the contacts 118 of the stop switch, the terminal R7 and the shaded winding to ground thus reversing the pen motor 58 so that it moves the pen arm 24 outwardly at a substantially constant rate until the switch 118 is opened near the bottom of the piston stroke to end the timing period.

The rotation of the pen arm shaft 82 also rotates a cam 304 whose effective surface bears against a roller 316 mounted upon one end of a pivotally mounted bar 310. A substantially horizontal oscillatable bar 306 is maintained in contact with the bar 310 by means of a spring 318. The horizontal bar 306 also carries actuators for a control switch 250 whose point of operation is adjustable, a high alarm switch 233 which is closed until the bar 306 reaches a predetermined position and a low alarm switch 234 which is open until the bar reaches a second independently predetermined position. From the above it will be evident that the number of revolutions of the motor 58 and therefore the relative horizontal movement of the bar 306 is a function of the viscosity of the liquid and that the switches 233, 234 and 250 are adjustable to operate at positions of the bar which correspond to given viscosity readings.

When the viscosity of the fluid is either above or below limits preselected by positioning of the switches 233 and 234 respectively, an alarm such as a light or horn 232 is sounded. This is accomplishehd by energizing the horn 232 by means of a circuit including the terminal R2, the main switch 348, the terminals R9 and R10, the horn 232, the normally closed contacts 480 of the alarm relay 238 and the terminal R8. This circuit is interrupted during normal operating conditions by the opening of the normally closed contacts 480 by the energization of the solenoid 482 of the alarm relay 238. When the viscosity of the fluid 30 falls between the limits preselected by positioning the alarm switches 233 and 234 are both closed so that the alarm relay solenoid 482 is energized by a circuit including the terminal R1, the switch 124, the terminal R4, the alarm switches 233 and 234 the alarm relay solenoid 482, the main switch 348 to the terminal R2. The momentary opening of the switch 124 after the piston 36 reaches the bottom of its stroke as described heretofore, momentarily interrupts the energizing circuit but the immediate deenergizing of the firing relay 108 closes the contacts 111 which provide an electrical path from the terminal R8 which parallels the switches 124 and 348 as described heretofore so that the alarm relay 238 does not remain deenergized to close the circuit of the horn 232.

If the viscosity of the fluid 30 is below the lower preset limit determined by the position of the low alarm switch 234, the contacts of this switch are not closed so that when switch 124 opens an energizing circuit is not completed for the solenoid 482 of the alarm relay 238. Its normally closed contacts 480 remain closed and the horn 232 sounds until a manual reset 340 is pressed by the operator directly to connect the alarm relay solenoid 482 to the terminal R8. Upon the release of the reset 342 the alarm relay solenoid 482 remains energized through a holding circuit completed through its normally open contacts 483 to shunt the alarm switches 233 and 234.

If the viscosity exceeds the upper preselected limit as determined by the positioning of the high alarm switch 233, the switch contacts open. When the reset switch 124 opens after the bottom of the piston stroke is reached, the normally open holding contacts 483 of the alarm relay 238 open upon the momentary interruption of the energizing circuit of its solenoid 482. Because the switch 233 is open the circuit is not reestablished to re-energize the alarm relay solenoid 482 and the normally closed contacts energize the horn 232 until the switch 233 closes as the bar 306 (Fig. 3) returns towards the zero viscosity position.

When the viscosity increases to a value selected by the positioning of the control switch 250, the horizontal bar 306 closes the switch contacts to energize the solenoid 484 of a control relay 240. One pair of normally open contacts 486 of the control relay 240 are used as holding contacts to shunt the control switch 250 so that the solenoid 484 remains energized when switch opens as the bar 306 returns to the zero viscosity position during each sampling cycle.

The remaining contacts of the control relay are used as required for controlling external circuits. In Fig. 2 a pair of normally open contacts 488 are in series with the solenoid 236 between the terminals R1 and R2 whereby the solenoid is energized by the operation of the control relay 240 as described in detail heretofore. When used to control a liquid such as a size mixture whose viscosity decreases with recirculation, the solenoid 236 is used as the coil of an auxiliary relay whose normally open contacts (not shown) are opened to interrupt the circuit to the motor which drives the recirculating pump 305 (Fig. 1) when the viscosity reaches the preselected limit. Conversely when used to control a liquid whose viscosity increases with recirculation the solenoid 236 is used to close normally closed contacts to start the recirculating pump motor when the preselected viscosity limit is reached. It will of course be evident that the sequence of steps in the above process can be reversed so that the recirculation takes place before the heating.

Figure 4:
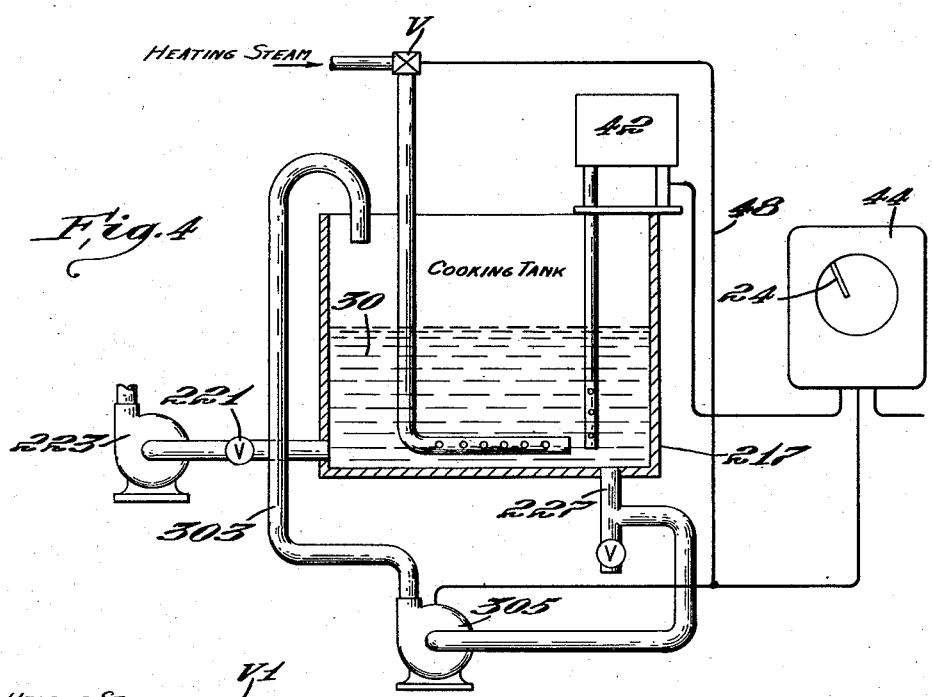
Fig. 4 is a schematic diagram of the second embodiment of the invention with the heating means incorporated in the cooking tank.

It is also possible to accomplish both the heating and recirculating in a single tank by installing the sampling device 42 upon the cooking kettle 217 as is shown in Fig. 4 wherein the recirculating pump 305 is connected with the cooking kettle so that it can be employed to recirculate the size to decrease its viscosity in a manner similar to that described in detail heretofore in connection with the mixing tank. When using the viscometer to control the viscosity in the cooking kettle 217 it is desirable simultaneously to control the heating means by an electrically operated valve V which is inserted in the heating steam supply line. The valve may be operated by either an electric solenoid or an electric motor. The solenoid or motor is energized by connecting it in parallel with the recirculating motor starter as is shown in Fig. 3.

Figure 5:
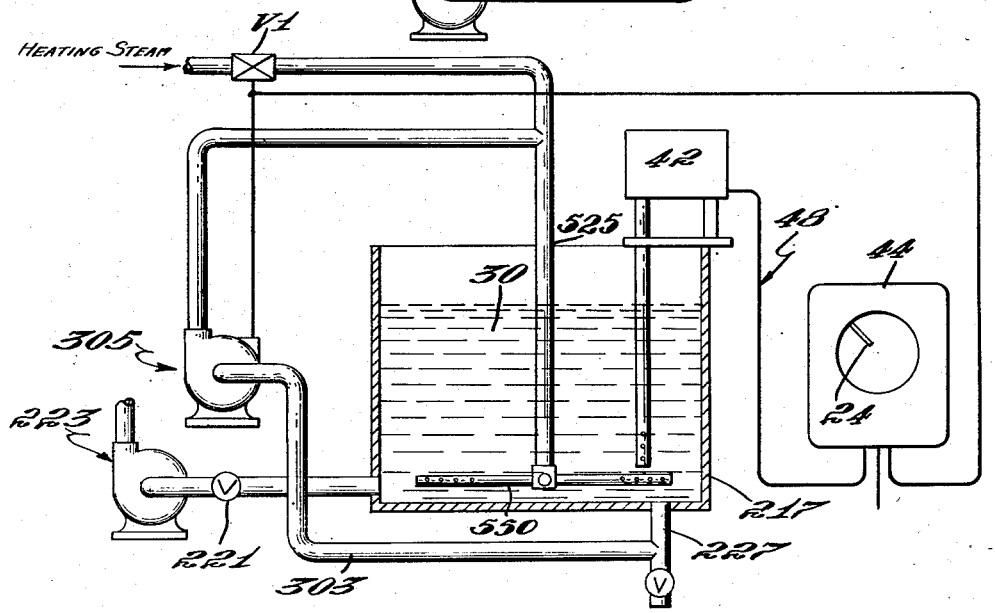
Fig. 5 is a schematic diagram similar to the diagram in Fig. 4 with the heating means in the recirculating line.

It is also possible to modify the apparatus shown in Fig. 4 so that the size discharged from the recirculating pump 305 is introduced into the heating steam line 525 as is shown in Fig. 5. At the lower end of the line 525 is transversely positioned a submerged mixing chamber 550 which discharges the mixture of size and steam under pressure beneath the surface of the size in the kettle through a plurality of small orifices in the chamber wall rather than directly into the top of the tank as in the embodiment shown in Fig. 4 thereby to obtain more thorough mixing and uniformity of size particles. The heating is controlled by a valve V1 which regulates the steam flow into the line 525. In either case the wiring of the control system is the same as that shown in Fig. 3 and described in detail below.

The wiring diagram shown in Fig. 3 is essentially the same circuit as that shown in Fig. 2 with the addition of a timing circuit, whose function will be described below, connected to shunt the control switch 250, the similar elements in both circuits bearing the same indicia and are connected to in a manner the same as has been described in detail heretofore.

At the start of the cooking or heating cycle the size mixture has a comparatively low viscosity which increases to a paste like consistency so that the control circuit must be arranged so as not to shut off the heating steam during this portion of the cycle. To this end the control switch 250 is shunted by a pair of contacts 500 of a relay 502 to complete an energizing circuit for the control relay solenoid 484 which includes the terminal R2, the switch 348, the control relay solenoid, the contacts 500 to the terminal R4. The contacts 500 are maintained closed by a relay solenoid 504 which is energized by a circuit including the terminal R8, the time opening contacts 506 of a timer T, the relay solenoid 504 and the terminal R2. At the beginning of each heating cycle the operator closes the contacts of a start button 508 to shunt the time opening contacts 506 thereby to energize both the relay solenoid 504 and the timer to close the contacts 506 and start the timer motor 510. The timer T is set so that after an elapse of approximately 30 minutes the motor 510 opens the contacts 506 thus deenergizing the solenoid 504 to open the contacts 500. The operation of the control relay 240 is then determined solely by the control switch 250 which closes to shut down both the recirculating pump and heating steam in a manner similar to that described in detail heretofore when the preselected viscosity is reached.

It will be obvious that the above circuit can be modified to control either the heating means or the recirculating pump by disconnecting the valve V or the magnetic starter from the control relay contacts as the case may be.

It should be understood that the present disclosure is for the purpose of illustration only and that this invention includes all modifications and equivalents which fall within the scope of the appended claims.

I claim:

1. Apparatus for controlling the heating and homogenizing means for preparing liquid such as an aqueous size comprising a viscosity measuring device including a tubular member suspended with its lower apertured end projecting into the size so that the size flows therein, a droppable body disposed within said tube, means for periodically elevating and releasing said droppable body whereby the period of its traversing size entrapped within the tubular member is a function of the viscosity thereof, control means including switches operable at the beginning and end of the timing period, a constant speed motor controlled by said switches, a member moved by said motor a distance which is a function of the duration of the time period required for said droppable body to traverse a portion of said entrapped size determined by the operating of said switches, relay means for controlling the heating and homogenizing means, and a control switch operated by the movable member to transfer the relay means to maintain the viscosity of the size within a preselected limit.

2. Apparatus for controlling the heating and homogenizing means for preparing liquid such as an aqueous size comprising means for determining the viscosity of the size, and control means including time delay means responsive to the viscosity determined means for rendering the heating and homogenizing means inoperative after the viscosity of the size has reached a preselected limit, the time delay means preventing the operation of the control means until after the size has been heated.

3. Apparatus for controlling the heating and homogenizing means for preparing liquid such as an aqueous size comprising a viscosity measuring device including a tubular member suspended with its lower apertured end projecting into the size so that the size flows therein, a droppable body disposed within said tube, means for periodically elevating and releasing said droppable body whereby the period of its traversing size entrapped within the tubular member is a function of the viscosity thereof, means for timing the duration of the droppable body in traversing a predetermined portion of said entrapped size, and control means including time delay means responsive to the duration of the traversing period of the droppable body to render the heating and homogenizing means inoperative after the viscosity of the size has reached a preselected limit, the time delay means preventing the operation of the control means until after the size has been heated.

4. Apparatus for controlling the heating and homogenizing means for preparing liquid such as an aqueous size comprising a viscosity measuring device including a tubular member suspended with its lower apertured end projecting into the size so that the size flows therein, a droppable body disposed within said tube, means for periodically elevating and releasing said droppable body whereby the period of its traversing solution entrapped within the tubular member is a function of the viscosity thereof; control means including switches operable at the beginning and end of the timing period, a constant speed motor controlled by said switches, a member moved by said motor a distance which is a function of the duration of the time period required for said droppable body to traverse a portion of said entrapped size determined by the operating of said switches; relay means for rendering the heating and homogenizing means inoperative; a control switch operated by the movable member to transfer the relay means to maintain the viscosity of the size within preselected limits; and time delay means for overriding the relay means during the period of heating the size.

5. Apparatus for the preparation of liquid such as size comprising a kettle for holding a supply of aqueous size, a mixing chamber having a restricted discharge beneath the surface of the size, pumping means for recirculating the size through the chamber thereby to homogenize the size molecules, means for introducing steam into the chamber to raise the temperature of the size, a viscosity determining device disposed in said size, and means responsive to said viscosity determining device for controlling the operation of one of said means to maintain the viscosity of the size within a preselected limit.

6. Apparatus for the preparation of liquid such as size comprising a kettle for holding a supply of aqueous size, a mixing chamber having a restricted discharge beneath the surface of the size, pumping means for recirculating the size through the chamber thereby to homogenize the size molecules, means for introducing steam into the chamber to raise the temperature of the size, a viscosity determining device disposed in said size, and a control circuit responsive to said viscosity determining device for controlling the operation of both of said means to maintain the viscosity of the size within a preselected limit.

7. Apparatus for the preparation of liquid such as size comprising a kettle for holding a supply of aqueous size, a mixing chamber having a restricted discharge beneath the surface of the size, a pump for withdrawing size from said kettle and discharging the size through the mixing chamber back into said kettle, means for introducing steam into the chamber to raise the temperature of the size, a viscosity determining device disposed in said size, and means responsive to the viscosity determining device for starting the operation of said pump when the viscosity rises above a preselected limit.

8. Apparatus for the preparation of liquid such as size comprising a kettle for holding a supply of aqueous size, a mixing chamber having a restricted discharge beneath the surface of the size, pumping means for recirculating the size through the chamber thereby to homogenize the size molecules, means for introducing steam into the chamber to raise the temperature of the size, a viscosity measuring device including a tubular member suspended with its lower apertured end projecting into the size so that the size flows therein, a droppable body disposed within said tube, means for periodically elevating and releasing said droppable body whereby the period of its traversing size entrapped within the tubular member is a function of the viscosity thereof, means for timing the duration of said droppable body in traversing a predetermined portion of said entrapped size, and control means responsive to the duration of the traversing period of the droppable body to control the pump to maintain the viscosity of the size within a preselected limit.

9. Apparatus for the preparation of liquid such as size comprising a kettle for holding a supply of aqueous size, a mixing chamber having a restricted discharge beneath the surface of the size, pumping means for recirculating the size through the chamber thereby to homogenize the size molecules, means for introducing steam into the chamber to raise the temperature of the size, a viscosity measuring device including a tubular member suspended with its lower apertured end projecting into the size so that the size flows therein, a droppable body disposed within said tube, a cam for periodically elevating and releasing said droppable body whereby the period of its traversing size entrapped within the tubular member is a function of the viscosity thereof, a timing device for timing the duration of said droppable body in traversing a predetermined portion of said entrapped size, and a control circuit responsive to the duration of the traversing period of the droppable body to control said means to maintain the viscosity of the size within a preselected limit.

10. Apparatus for the preparation of liquid such as size comprising a kettle for holding a supply of aqueous size, a mixing chamber having a restricted discharge beneath the surface of the size, pumping means for recirculating the size through the chamber thereby to homogenize the size melocules, means for introducing steam into the chamber to raise the temperature of the size, a viscosity measuring device including a tubular member suspended with its lower apertured end projecting into the size so that the size flows therein, a droppable body disposed within said tube, a cam for periodically elevating and releasing said droppable body whereby the period of its traversing size entrapped within the tubular member is a function of the viscosity thereof, a timing device for timing the duration of said droppable body in traversing a predetermined portion of said entrapped size, and a control circuit responsive to the duration of the traversing period of the droppable body to control one of said means to maintain the viscosity of the size within a preselected limit.

11. Apparatus for the preparation of liquid such as size comprising a kettle for holding a supply of aqueous size, a mixing chamber having a restricted discharge beneath the surface of the size, pumping means for recirculating the size through the chamber thereby to homogenize the size molecules, means for introducing steam into the chamber to raise the temperature of the size, a viscosity measuring device including a tubular member suspended with its lower apertured end projecting into the size so that the size flows therein, a droppable body disposed within said tube, means for periodically elevating and releasing said droppable body whereby the period of its traversing solution entrapped within the tubular member is a function of the viscosity thereof, control means including switches operable at the beginning and end of the timing period, a constant speed motor controlled by said switches, a member moved by said motor a distance which is a function of the duration of the time period required for said droppable body to traverse a portion of said entrapped size determined by the operating of said switches, relay means for controlling the pumping means, and a control switch operated by the movable member to transfer the relay means to maintain the viscosity of the size within a preselected limit.

12. Apparatus for the preparation of liquid such as size comprising a kettle for holding a supply of aqueous size, a mixing chamber having a restricted discharge beneath the surface of the size, pumping means for recirculating the size through the chamber thereby to homogenize the size molecules, means for introducing steam into the chamber to raise the temperature of the size, a viscosity measuring device including a tubular member suspended with its lower apertured end projecting into the size so that the size flows therein, a droppable body disposed within said tube, a cam for periodically elevating and releasing said droppable body whereby the period of its traversing solution entrapped within the tubular member is a function of the viscosity thereof, a control circuit including switches operable at the beginning and end of the timing period, a constant speed motor controlled by said switches, a member moved by said motor a distance which is a function of the duration of the time period required for said droppable body to traverse a portion of said switches, relay means for controlling said heating and pumping means, and a control switch operated by the movable member to transfer the relay means to maintain the viscosity of the size within a preselected limit.

References Cited in the file of this patent

UNITED STATES PATENTS

| | | |
|---|---|---|
| 2,325,573 | Thompson | July 27, 1943 |
| 2,452,142 | Pecker | Oct. 26, 1948 |
| 2,491,389 | Norcross | Dec. 13, 1949 |